(No Model.)
S. M. BEERY.
COUPLER HEAD FOR AIR BRAKE HOSE.
No. 485,365. Patented Nov. 1, 1892.
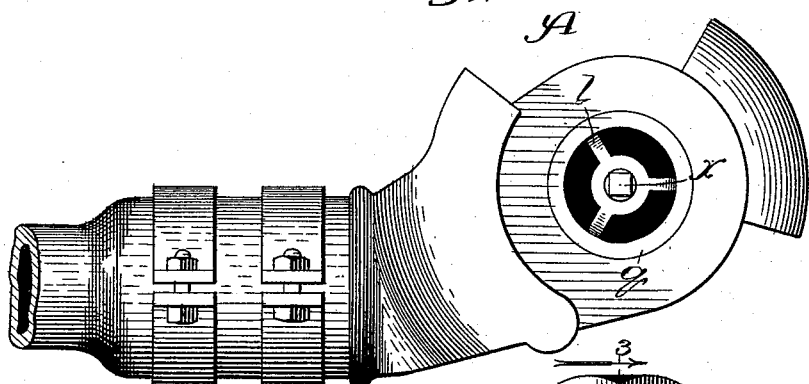
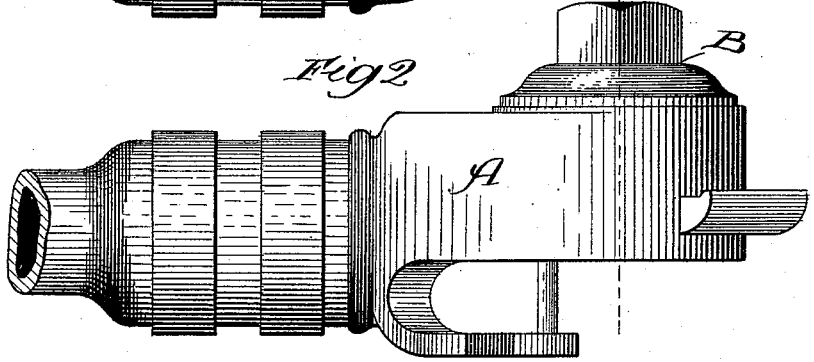
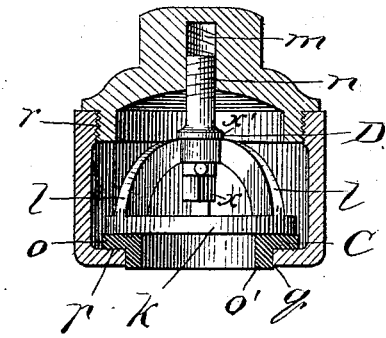
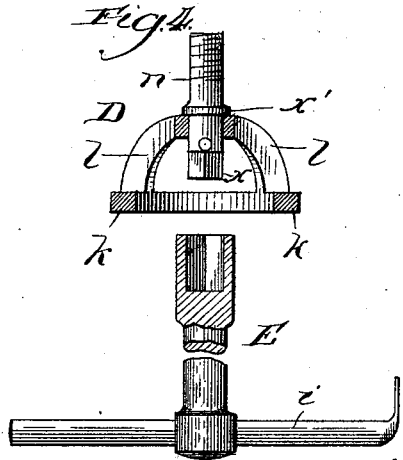
Witnesses:
Clifford N. White,
J. H. Dyrenforth.
Inventor:
Samuel M. Beery,
By Dyrenforth & Dyrenforth,
Att'ys

UNITED STATES PATENT OFFICE.

SAMUEL M. BEERY, OF CHICAGO, ILLINOIS, ASSIGNOR OF ONE-HALF TO JOHN H. BROWN, OF SAME PLACE.

COUPLER-HEAD FOR AIR-BRAKE HOSE.

SPECIFICATION forming part of Letters Patent No. 485,365, dated November 1, 1892.

Application filed July 19, 1892. Serial No. 440,443. (No model.)

*To all whom it may concern:*

Be it known that I, SAMUEL M. BEERY, a citizen of the United States, residing at Chicago, in the county of Cook and State of Illinois, have invented a new and useful Improvement in Coupler-Heads for Air-Brake Hose, of which the following is a specification.

A commonly-used form of coupler-head for coupling between cars the hose connections of air-brake pipes involves as its generally-stated construction a hollow elongated and flat-sided head provided on its exterior with engaging-pieces to co-operate with the companion head and with a hollow nipple at its rear end at which to attach the hose, the flat sides having openings in them, the opening in one side (the back of the head) being of greater diameter than that in the other, (face of the head,) which latter presents about its inner side a shoulder for a gasket adjusted into place through the larger opening, into which a nut is tightly screwed against the gasket to hold it and close the opening in the back of the head. To seal the joint formed by the nut it is common to apply red lead around the junction. The gasket, which protrudes slightly beyond the surface of the face of the coupler, becomes worn or so disorganized, or both, with use as to cause leakage at the coupling, requiring the gasket-packing to be renewed, since the work required of the pumping mechanism to maintain the necessary air-pressure in the leaking pipe system tends greatly to overheat and strain it; but renewal of the gasket in a head necessitates removal of the latter from the car to gain access to the worn gasket, since the plug or nut has to be withdrawn to permit such access, and (the nut being, as aforesaid, so tightly screwed into place and also, as commonly, sealed with red lead) to do this the head must be placed in a vise. It will therefore be apparent that with the old construction of head referred to it is quite impracticable to renew defective gaskets conveniently, with the consequence that the pumping mechanism must be subjected to overwork and overheating to maintain the requisite air-pressure till the use of the car or cars at which the leakage occurs can be dispensed with long enough to enable the repairs to be made.

My object is to overcome the trouble referred to by a construction enabling defective gaskets to be removed and supplanted by new ones in the heads of air-brake hose-couplings without requiring the nuts to be removed for the purpose from the heads, whereby the nuts need never be disturbed after being once fastened in place, and a train-hand may readily during a short stop of a train repair a considerable number of leakages by removing the defective gaskets from coupler-heads and inserting new ones. This I accomplish by my improved construction hereinafter described and illustrated in the accompanying drawings.

Figure 1 is a side or face view of an old form of coupler-head provided with my improvement. Fig. 2 is a plan view of the same. Fig. 3 is a section taken on the line 3 of Fig. 1, viewed in the direction of the arrow, and showing my improved adjustable means for clamping the gasket independently of the nut. Fig. 4 is a view in sectional elevation of the clamping means removed from the coupler-head, the view also showing a key for tightening and loosening the gasket-clamp from the inner or face opening of the head.

The coupler-head A selected for illustrating my improvement is of old and well-known form and construction and need not, therefore, be herein described in detail. It is to be understood, however, that I do not intend to confine my improvement to use with the particular form of the head shown, as it may be used with equal advantage with other forms thereof. B is the nut or plug fastened into the opening $r$ in the back of the head, and around the opening $q$ in the face of the coupler-head is the shoulder $p$, against which the annular flange $o$ of the gasket C bears, the part $o'$ thereof protruding through the opening $q$. D is my improved adjustable clamp. As shown, it comprises a threaded stem $n$, having its bearing in a threaded socket $m$ in the center of the inner face of the nut B and having swiveled and confined upon it toward its free end, between a collar $x'$ and a key-head $x$, a "crab" or spider $l$, terminating in a flat ring $k$, adapted to bear against the annular flange about the gasket, and thereby force and confine it against the shoulder $p$.

By means of my improved construction to adjust a gasket into place against the shoulder $p$ it is crowded through the opening $q$ into the head A, the ring $k$ having been previously withdrawn into the head to make room for the gasket by turning the stem to drive it into its socket $m$ through the medium of a key E applied to the key-head $x$. When the gasket has then been seated in place, the stem $n$ is turned in the direction of unscrewing to withdraw it from its socket $m$, whereby it forces the ring $k$ perpendicularly against the gasket-flange $o$, and thus firmly clamps the gasket C. To remove the gasket for replacing it with a new one it is only necessary to apply the key E to the stem and turn the latter to free from the clamp the gasket, when the latter may readily be withdrawn, the key being provided at an end of its handle portion $i$ with a bent prong or claw to be inserted into the opening containing the gasket for loosening and withdrawing the latter.

The feature of the construction of having the clamp proper $k$ swiveled on the stem so that it shall not rotate with the latter and confined thereon to advance against the gasket by actuating the screw-stem I consider very important, inasmuch as were it fast on the stem the extent of adjustment of which the clamp were capable would be limited, since on the ring $k$ or bearing forming the clamp proper being brought more or less firmly against the gasket it would not rotate farther, because the rubber would tend to brake it. Hence the clamping effect would be comparatively slight.

What I claim as new, and desire to secure by Letters Patent, is—

In a coupling for air-brake hose, the combination, with a hollow head A, having openings in its back and face, of a nut B, screwed into the back opening and having a threaded socket $m$ in its inner face, and an adjustable clamp D for a gasket C, said clamp being operative through the face-opening in the gasket-packed coupler-head and comprising a rotary screw-stem $n$ in the nut-socket $m$ and a spider $l$, carrying a clamping-ring $k$ and confined and swiveled on the stem $n$ to rotate freely thereon, said ring bearing outwardly against the gasket-flange about the inner margin of the face-opening in the coupler-head, substantially as and for the purpose set forth.

SAMUEL M. BEERY.

In presence of—
M. J. FROST,
M. E. WINN.